US012756811B2

(12) United States Patent
Fattal

(10) Patent No.: US 12,756,811 B2

(45) Date of Patent: Oct. 6, 2026

(54) 3D DISPLAY SYSTEM AND METHOD EMPLOYING STEREO MAPPING COORDINATES

(71) Applicant: LEIA Inc., Menlo Park, CA (US)

(72) Inventor: David A. Fattal, Mountain View, CA (US)

(73) Assignee: LEIA Inc., Nashua, NH (US)

(*) Notice: Subject to any disclaimer, the term of this patent is extended or adjusted under 35 U.S.C. 154(b) by 0 days.

(21) Appl. No.: 19/132,761

(22) PCT Filed: Dec. 24, 2023

(86) PCT No.: PCT/US2023/085874

§ 371 (c)(1),
(2) Date: May 23, 2025

(87) PCT Pub. No.: WO2024/145265

PCT Pub. Date: Jul. 4, 2024

(65) Prior Publication Data

US 2026/0082026 A1 Mar. 19, 2026

Related U.S. Application Data

(60) Provisional application No. 63/478,164, filed on Jan. 1, 2023, provisional application No. 63/478,162, filed (Continued)

(51) Int. Cl.

*H04N 13/305* (2018.01)
*H04N 13/156* (2018.01)

(Continued)

(52) U.S. Cl.

CPC ......... *H04N 13/305* (2018.05); *H04N 13/156* (2018.05); *H04N 13/31* (2018.05); *H04N 13/317* (2018.05); *H04N 13/366* (2018.05)

(58) Field of Classification Search

CPC .... H04N 13/305; H04N 13/156; H04N 13/31; H04N 13/317; H04N 13/366; H04N 13/324

See application file for complete search history.

(56) References Cited

U.S. PATENT DOCUMENTS

| | | | | |
|---|---|---|---|---|
| 6,064,424 A * | 5/2000 | van Berkel | H04N 13/317 | 348/E13.058 |
| 2008/0204550 A1* | 8/2008 | De Zwart | H04N 13/317 | 348/51 |

(Continued)

FOREIGN PATENT DOCUMENTS

| | | |
|---|---|---|
| CN | 108881893 A | 11/2018 |
| CN | 120500840 | 8/2025 |

(Continued)

OTHER PUBLICATIONS

"International Application Serial No. PCT/US2023/085874, International Search Report mailed Apr. 24, 2024", 3 pgs.

(Continued)

*Primary Examiner* — Nasim N Nirjhar

(74) *Attorney, Agent, or Firm* — Schwegman, Lundberg & Woessner, P.A.

(57) ABSTRACT

In a three-dimensional (3D) display, a display panel having an array of subpixels may display an image according to stereo mapping coordinates associated with a viewer. A periodic optical element may direct light from the display panel to the viewer. The periodic optical element may be invariant along an optical axis having a slant angle relative to the display panel. A viewer tracker may determine a location of the viewer. The stereo mapping coordinate of a selected subpixel of the array of subpixels may be a function of the location of the viewer, a location of the selected subpixel, a phase function of the periodic optical element, a separation between the periodic optical element and the (Continued)

display panel, and a refractive index of a material disposed between the periodic optical element and the display panel.

19 Claims, 8 Drawing Sheets

Related U.S. Application Data on Jan. 1, 2023, provisional application No. 63/478,163, filed on Jan. 1, 2023.

(51) Int. Cl.
*H04N 13/31* (2018.01)
*H04N 13/317* (2018.01)
*H04N 13/366* (2018.01)

(56) References Cited

U.S. PATENT DOCUMENTS

| | | | | |
|---|---|---|---|---|
| 2012/0019670 | A1* | 1/2012 | Chang | H04N 13/111 348/189 |
| 2013/0114135 | A1 | 5/2013 | Lin | |
| 2014/0152663 | A1 | 6/2014 | Aoki | |
| 2016/0191906 | A1 | 6/2016 | Song | |
| 2017/0155893 | A1 | 6/2017 | Mather et al. | |
| 2018/0144537 | A1* | 5/2018 | Park | H04N 13/32 |
| 2022/0070427 | A1 | 3/2022 | Ha et al. | |
| 2025/0093679 | A1* | 3/2025 | Qiao | G02B 30/33 |

FOREIGN PATENT DOCUMENTS

| | | |
|---|---|---|
| JP | 2026501596 | 1/2026 |
| TW | 201320717 A | 5/2013 |
| TW | 202006447 A | 2/2020 |
| TW | 202433918 A | 8/2024 |
| TW | I890243 | 7/2025 |
| TW | 202545181 | 11/2025 |
| WO | WO-2024145265 A1 | 7/2024 |

OTHER PUBLICATIONS

"International Application Serial No. PCT/US2023/085874, Written Opinion mailed Apr. 24, 2024", 4 pgs.
"Taiwanese Application Serial No. 112150648, Office Action mailed Oct. 18, 2024", w/ English translation, 13 pgs.
"Taiwanese Application Serial No. 112150648, Response filed Jan. 10, 2025 to Office Action mailed Oct. 18, 2024", W/English Claims, 39 pgs.
"European Application Serial No. 23913601.3, Extended European Search Report mailed Feb. 12, 2026", 13 pgs.
"International Application Serial No. PCT US2023 085874, International Preliminary Report on Patentability mailed Jul. 10, 2025", 6 pgs.

* cited by examiner

3D DISPLAY SYSTEM AND METHOD EMPLOYING STEREO MAPPING COORDINATES

CROSS-REFERENCE TO RELATED APPLICATIONS

This application is a U.S. National Stage Filing under 35 U.S.C. 371 from International Application No. PCT/US2023/085874, filed on Dec. 24, 2023, and published as WO 2024/145265, which claims priority to U.S. Provisional Patent Application Ser. Nos. 63/478,162, 63/478,163, and 63/478,164, filed Jan. 1, 2023, the entirety of each of which is incorporated by referenced herein.

STATEMENT REGARDING FEDERALLY SPONSORED RESEARCH OR DEVELOPMENT

N/A

BACKGROUND

A multiview display, such as a three-dimensional (3D) display, may direct different views of an image to the two eyes of a viewer. There is ongoing effort to reduce or eliminate artifacts associated with the views.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

In a 3D display, a display panel having an array of subpixels may display an image according to stereo mapping coordinates associated with a viewer. A periodic optical element may direct light from the display panel to the viewer. The periodic optical element may be invariant along an optical axis having a slant angle relative to the display panel. A viewer tracker may determine a location of the viewer. The stereo mapping coordinate of a selected subpixel of the array of subpixels may be a function of the location of the viewer, a location of the selected subpixel, a phase function of the periodic optical element, a separation between the periodic optical element and the display panel, and a refractive index of a material disposed between the periodic optical element and the display panel.

A controller may use the stereo mapping coordinate from a particular subpixel to determine whether light from the subpixel is directed to a left eye or a right eye of the viewer. The controller may use the stereo mapping coordinate of the subpixel to select which image to represent with the subpixel, such as a subpixel of a “left image” to be directed to the left eye of the viewer, a subpixel of a “right image” to be directed to the right eye of the viewer, or a weighted combination of the subpixel of “left image” and the subpixel of the “right image.”

As used herein, the article ‘a’ is intended to have its ordinary meaning in the patent arts, namely ‘one or more’. For example, ‘a subpixel’ means one or more subpixels and as such, ‘the subpixel’ means ‘the subpixel(s)’ herein. Also, any reference herein to ‘top’, ‘bottom’, ‘upper’, ‘lower’, ‘up’, ‘down’, ‘front’, ‘back’, ‘first’, ‘second’, ‘left’ or ‘right’ is not intended to be a limitation herein. Herein, the term ‘about’ when applied to a value generally means within the tolerance range of the equipment used to produce the value, or may mean plus or minus 10%, or plus or minus 5%, or plus or minus 1%, unless otherwise expressly specified. Further, the term ‘substantially’ as used herein means a majority, or almost all, or all, or an amount within a range of about 51% to about 100%. Moreover, examples herein are intended to be illustrative only and are presented for discussion purposes and not by way of limitation.

Figure 1:
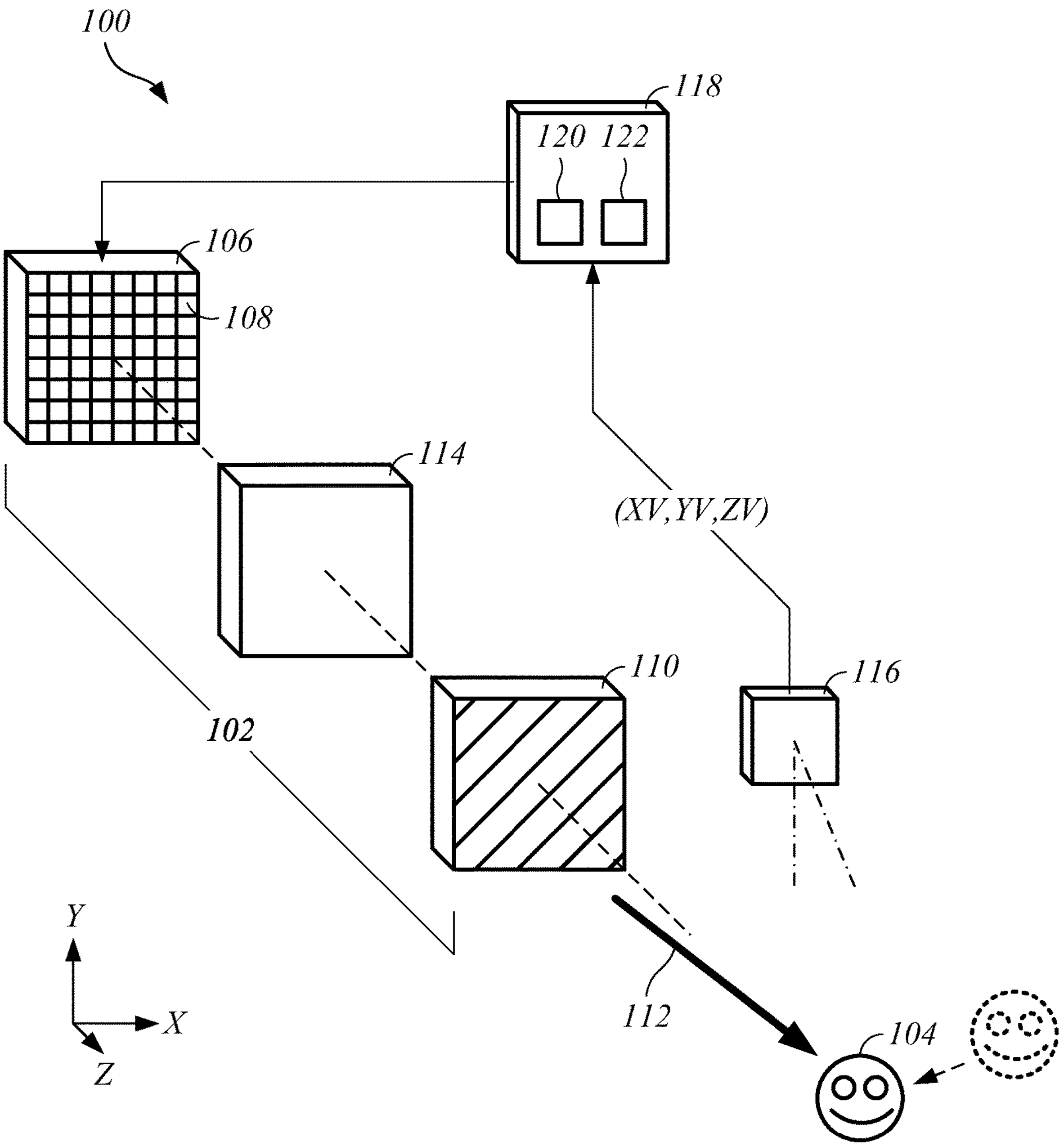
FIG. 1 illustrates a schematic diagram of a three-dimensional (3D) display system that includes a 3D display in an example, according to an embodiment of the principles described herein.

FIG. 1 illustrates a schematic diagram of a 3D display system 100 that includes a 3D display 102 in an example, according to an embodiment of the principles described herein. In particular, FIG. 1 illustrates an exploded view of the 3D display 102. The sign conventions shown in FIG. 1 and used below assume that the 3D display 102 extends in an (x, y) plane, and that a z-axis extends away from the 3D display 102 and generally toward a viewer, along a direction that is orthogonal to a plane of the 3D display 102. Other sign conventions may also be used.

As illustrated in FIG. 1, the 3D display 102 may include a display panel 106 that may have an array of subpixels 108 configured to display an image according to stereo mapping coordinates associated with a viewer 104. The subpixels 108 may be located at subpixel locations in a grid having grid axes. Each subpixel 108 may generate light having a specified color. For example, the subpixels 108 may include red subpixels, green subpixels, and blue subpixels, which generate red light, green light, and blue light, respectively. Other color/wavelength schemes may also be used. The subpixels 108 may be grouped into pixels, with each pixel including at least two subpixels 108 that produce light of different colors. Two possible configurations for the display panel 106 are described below and shown in FIGS. 2 and 3. Other configurations may also be used.

Figure 2:
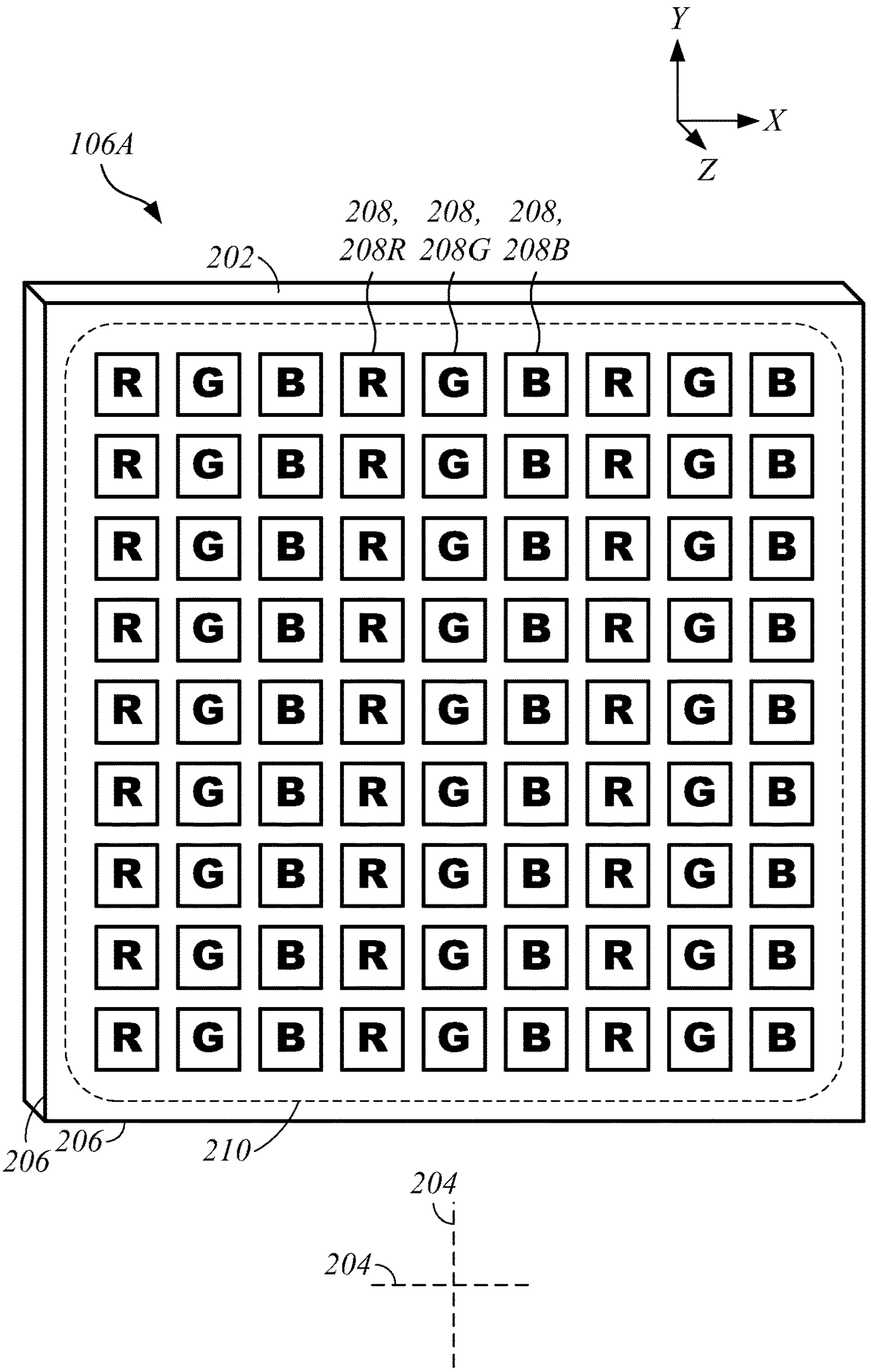
FIG. 2 illustrates a front view of a display panel that includes an array of light-emitting diodes in an example, according to an embodiment of the principles described herein.

FIG. 2 illustrates a front view of a display panel 106A that includes an array 202 of light-emitting diodes 208 in an example, according to an embodiment of the principles described herein. In some embodiments, the light-emitting diodes 208 of the array 202 may comprise organic light-emitting diodes (OLEDs). Each light-emitting diode 208 may correspond to a subpixel 108. The array 202 of light-emitting diodes 208 may include red light-emitting diodes 208R, green light-emitting diodes 208G, and blue light-emitting diodes 208B, which correspond to the red subpixels, green subpixels, and blue subpixels, respectively. A controller 118 (described below) may control the light-emitting diodes 208 individually or in one or more groups. Each light-emitting diodes 208 may controllably generate light in response to an electrical signal provided by the controller 118 or by suitable light-emitting diode driving circuitry in communication with the controller 118. The controller 118 may cause a specified light-emitting diode 208 to be directly powered with a power that varies as a function of an intensity in a corresponding location in the image. The power delivered to a light-emitting diode 208 may optionally be pulse-width modulated at a modulation frequency that is greater than may be perceived by a human eye. Using pulse-width modulation may simplify a design of a light-emitting diode array controller, because it may generate an arbitrary average power level from a relatively small number of instantaneous power levels by varying a duty cycle of the power. In some examples, the array 202 of light-emitting diodes 208 may be arranged in a rectangular or square repeating pattern over a surface area 210 of the array 202. For example, the array 202 may have grid axes 204 that are orthogonal to each other. In some examples, the grid axes 204 may be parallel to edges 206 of the array 202 of light-emitting diodes 208.

Figure 3:
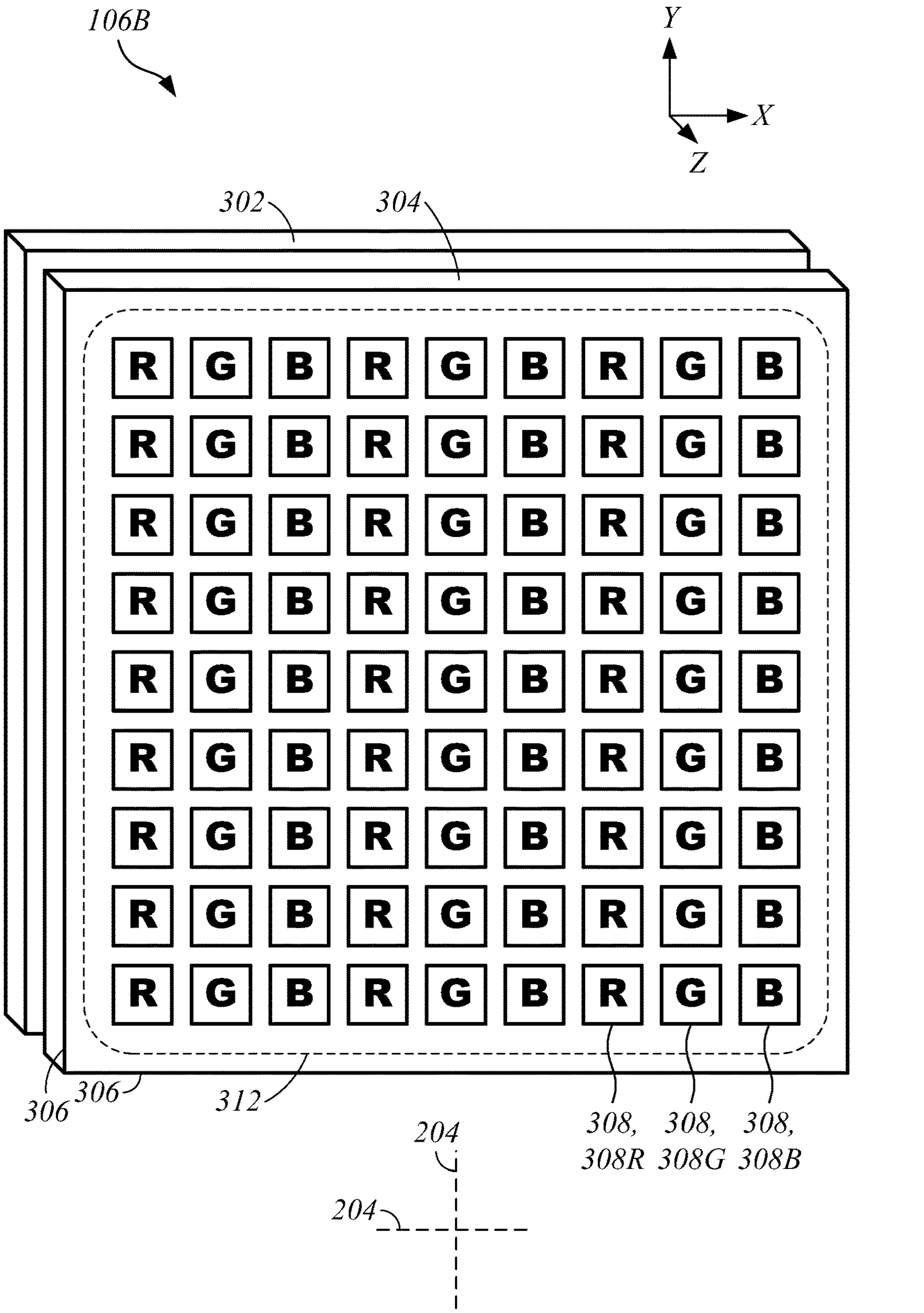
FIG. 3 illustrates a front view of a display panel that includes a backlight and a light valve array in an example, according to an embodiment of the principles described herein.

FIG. 3 illustrates a front view of a display panel 106B that includes a backlight 302 and a light valve array 304 in an example, according to an embodiment of the principles described herein. Although FIG. 3 illustrates the backlight 302 and the light valve array 304 as being separated, in practice, the backlight 302 and the light valve array 304 may be in contact or may be located as close together as is practical. The backlight 302 may provide illumination having a uniform or substantially uniform intensity over a surface area of the backlight 302. The backlight 302 may provide illumination having a relatively broad spectrum, such as including most or all of the visible portion of the electromagnetic spectrum. The backlight 302 may provide the illumination into a continuum of propagation angles toward the light valve array 304. The backlight 302 may provide unmodulated illumination to the light valve array 304. The light valve array 304 may include light valves 308 that are individually controllable or controllable in one or more groups by a controller 118 (described below). Each light valve 308 may controllably attenuate the illumination from the backlight, such as in response to an electrical signal provided by the controller 118 or by suitable light valve driving circuitry in communication with the controller 118. The light valves 308 may have color filters that allow only a portion of the electromagnetic spectrum to pass through the light valve 308. For example, the light valves 308 may include red light valves 308R that have a red filter that allows only red light to pass through the red light valves 308R, green light valves 308G that have a green filter that allows only green light to pass through the green light valves 308G, and blue light valves 308B that have a blue filter that allows only blue light to pass through the blue light valves 308B. Other color schemes and numbers of colors may also be used. Suitable light valve arrays 304 may include liquid crystal light valves, electrophoretic light valves, and light valves based on electrowetting, and others. In some examples, the light valves 308 of the light valve array 304 may be arranged in a rectangular or square repeating pattern over a surface area 312 of the light valve array 304. For example, the light valve array 304 may have grid axes 204 that are orthogonal to each other. In some examples, the grid axes 204 may be parallel to edges 306 of the light valve array 304.

Figure 4:
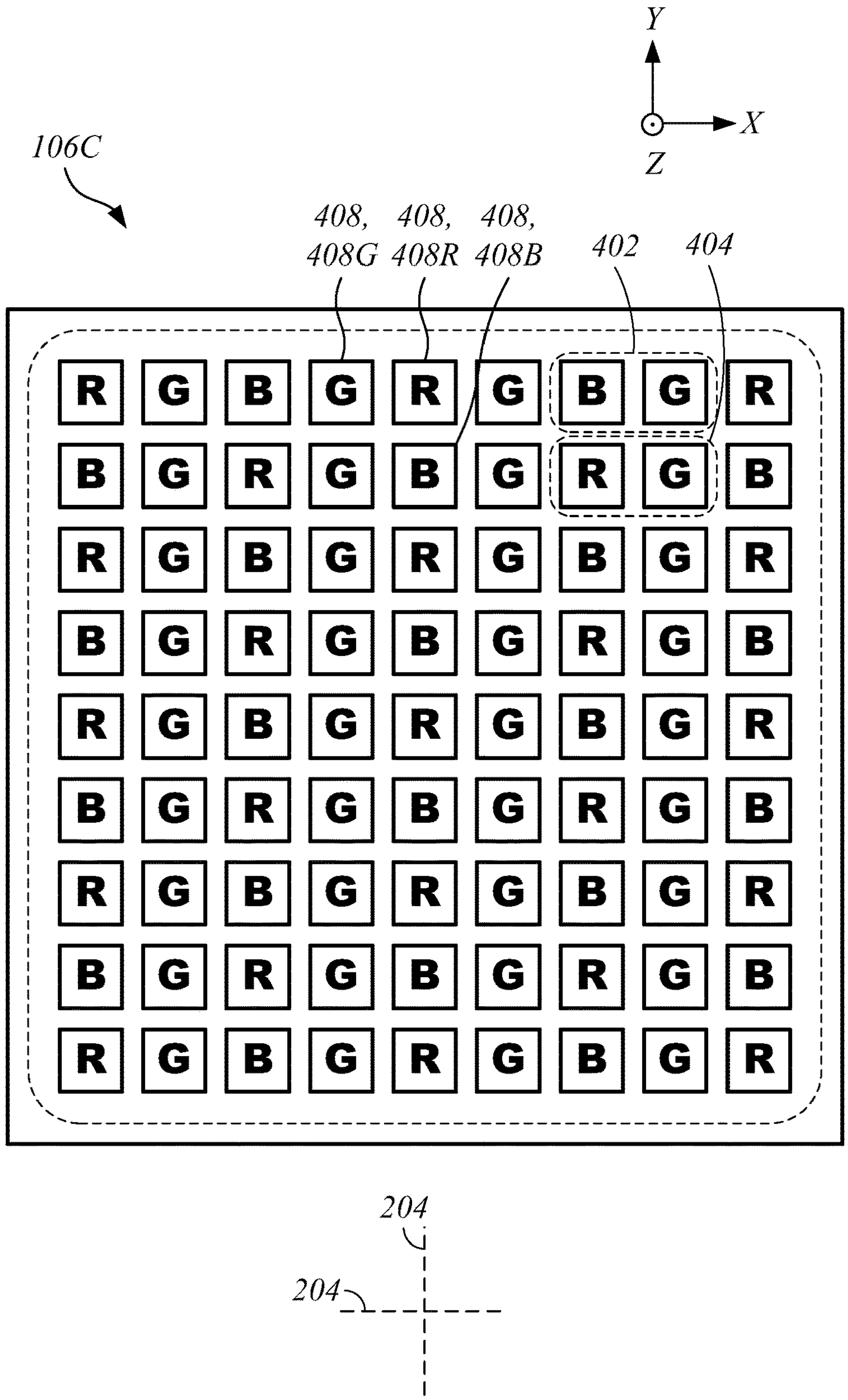
FIG. 4 illustrates a front view drawing of a display panel that includes a pentile arrangement of subpixels in an example, according to an embodiment of the principles described herein.

FIG. 4 illustrates a front view drawing of a display panel 106C that includes a pentile arrangement of subpixels 408 in an example, according to an embodiment of the principles described herein. The subpixels 408 may include light-emitting diodes 208 of an array 202 of light-emitting diodes 208, as illustrated in FIG. 2, or light valves 308 of a light valve array 304, as illustrated in FIG. 3, according to various embodiments. Compared to a traditional red-green-blue subpixel arrangement, in which each pixel includes a red subpixel 408R (e.g., a light emitting diode that produces red light), a green subpixel 408G (e.g., a light emitting diode that produces green light), and a blue subpixel 408B (e.g., a light emitting diode that produces blue light), the pentile subpixel arrangement may include just two subpixels 408 (or light-emitting diodes) per pixel 402. The colors of the subpixels 408 in the display panel 106C may be arranged such that the missing color of a particular pixel 402 may be found in an adjacent pixel 404. Although some display panels may employ subpixel rendering in software, which may help smooth features in the image, the display panel 106C described herein may turn off subpixel rendering when the image is displayed. For a display panel 106C that turns off subpixel rendering when the image is displayed, a location of each subpixel 408 (e.g., each light-emitting diode) may be used for calculating the corresponding stereo mapping coordinate, rather than a center of a pixel 402 (e.g., the center of a specified group of subpixels 408 or a specified group of light-emitting diodes 208).

Referring again to FIG. 1, the 3D display 102 may include a periodic optical element 110 that may direct light 112 corresponding to the image from the display panel 106 to the viewer 104. For example, the periodic optical element 110 may include a parallax optic or a parallax-generating optic. Two possible configurations for the periodic optical element 110 are described below and shown in FIGS. 5 and 6 and in FIGS. 7 and 8. Other configurations may also be used. Each of the configurations of FIGS. 5 and 6 and FIGS. 7 and 8 may be used in combination with any of the configurations of FIGS. 2 and 3.

Figure 5:
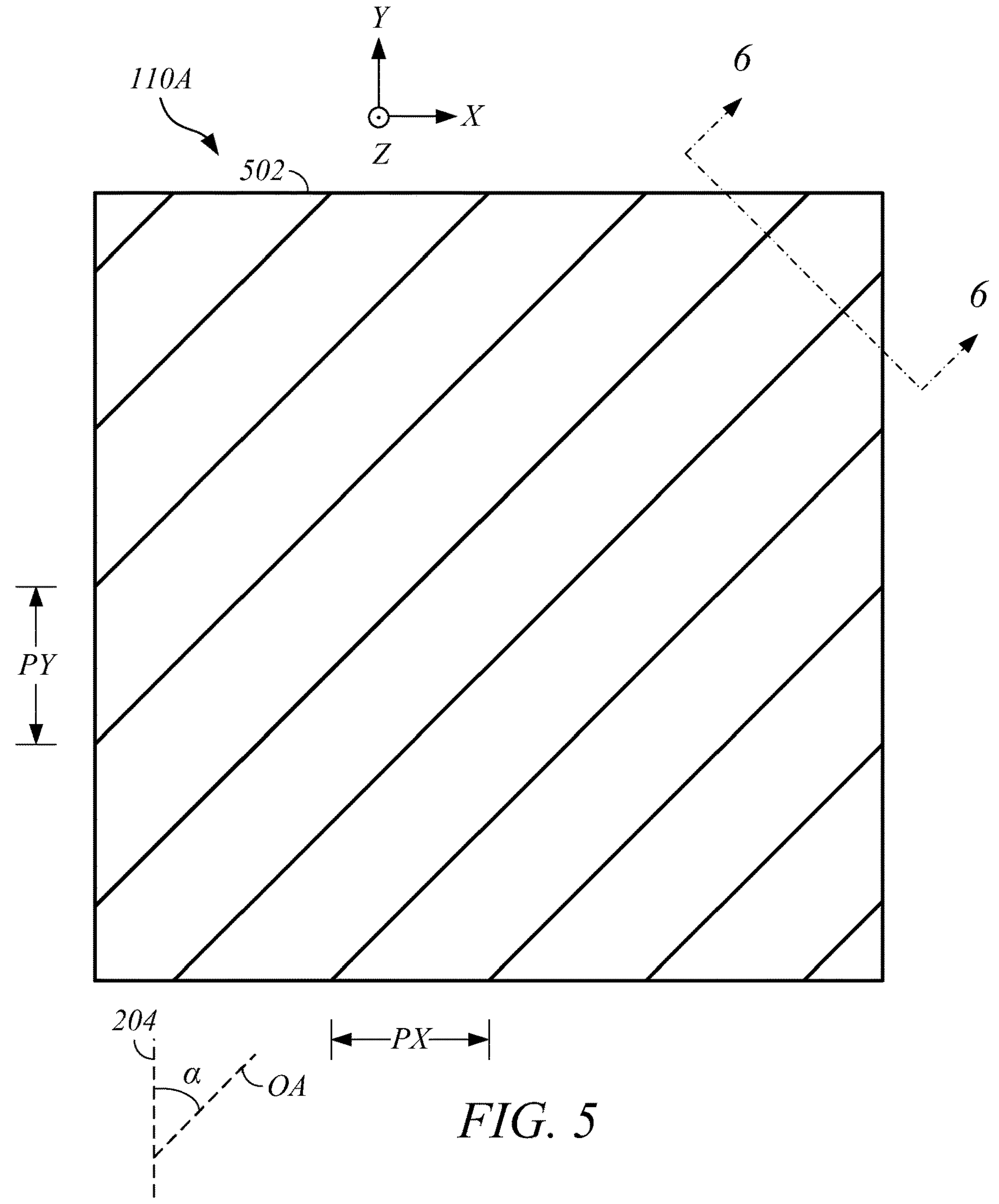
FIG. 5 illustrates a front view of a periodic optical element that includes a lenticular lens array in an example, according to an embodiment of the principles described herein.
Figure 6:
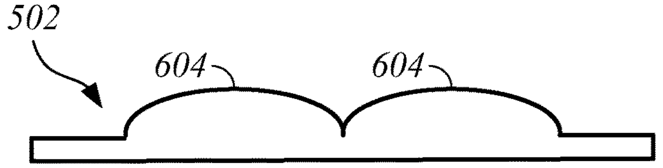
FIG. 6 illustrates a cross-sectional view of the lenticular lens array of FIG. 5 in an example, according to an embodiment of the principles described herein.

FIG. 5 illustrates a front view of a periodic optical element 110A that includes a lenticular lens array 502 in an example, according to an embodiment of the principles described herein. In some embodiments, the periodic optical element 110A that includes the lenticular lens array 502 may be referred to as either a parallax optic or a parallax-generating optic, by definition herein. FIG. 6 illustrates a cross-sectional view of the lenticular lens array 502 of FIG. 5 in an example, according to an embodiment of the principles described herein. The lenticular lens array 502 may include an array of thin cylindrical lenslets 604 positioned to receive light from the display panel 106 and at least partially focus the received light to direct the light to specified regions proximate the viewer's eyes.

Figure 7:
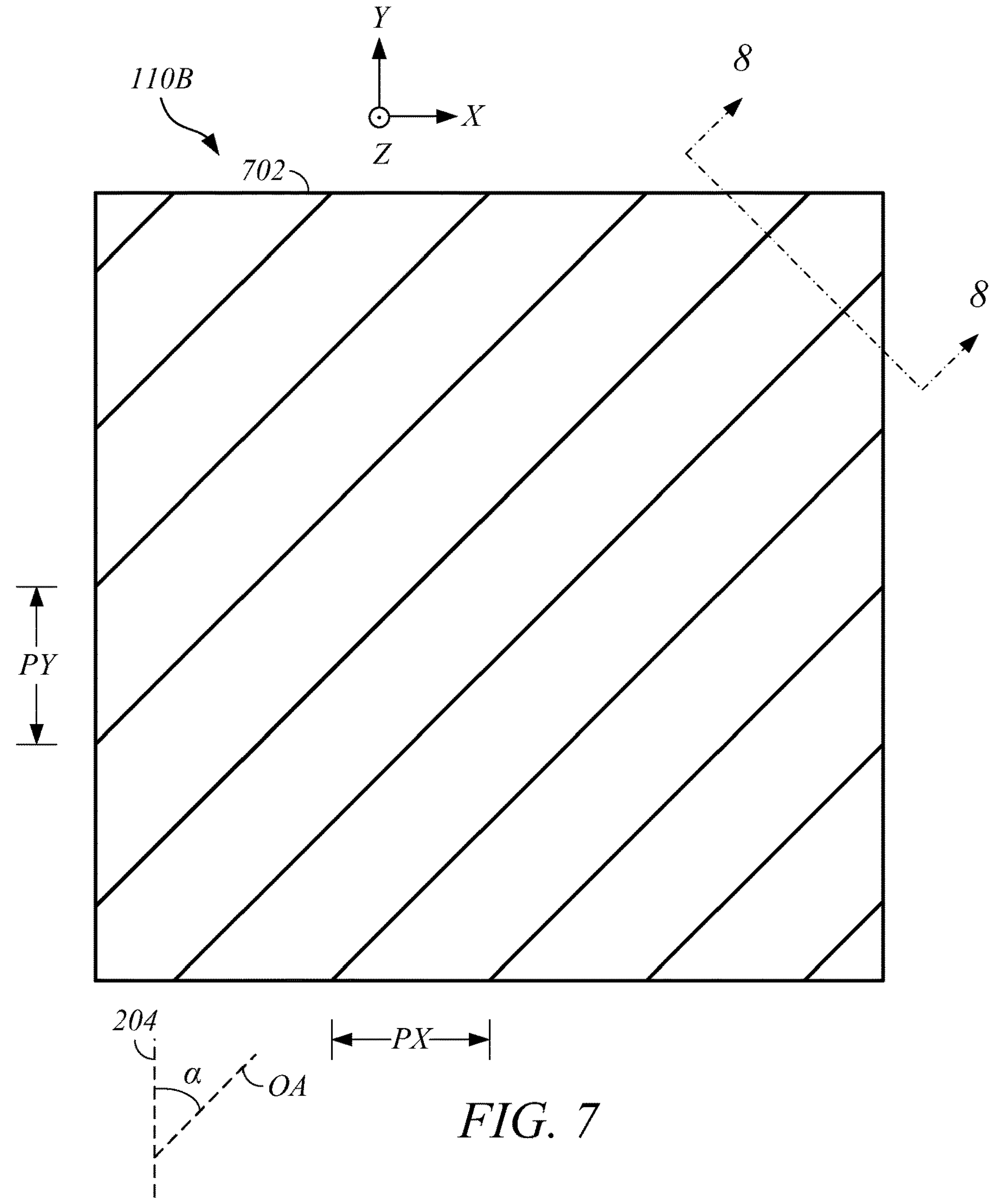
FIG. 7 illustrates a front view of a periodic optical element that includes a parallax barrier having transmissive slits in an example, according to an embodiment of the principles described herein.
Figure 8:
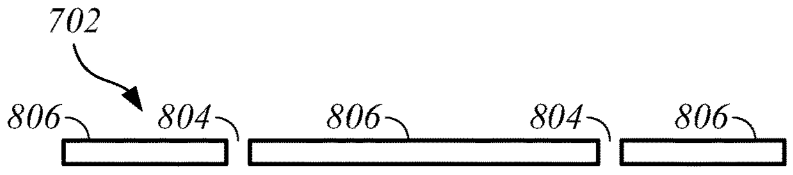
FIG. 8 illustrates a cross-sectional view of the parallax barrier having transmissive slits of FIG. 7 in an example, according to an embodiment of the principles described herein.

FIG. 7 illustrates a front view of a periodic optical element 110B that includes a parallax barrier 702 having transmissive slits 804 in an example, according to an embodiment of the principles described herein. In some embodiments, the periodic optical element 110B that includes the parallax barrier 702 may be referred to as either a parallax optic or a parallax-generating optic, by definition herein. FIG. 8 illustrates a cross-sectional view of the parallax barrier 702 having transmissive slits 804 of FIG. 7 in an example, according to an embodiment of the principles described herein. The parallax barrier 702 may include an array of opaque strips 806 and thin transmissive slits 804 arranged to occlude portions of a displayed image in left and right viewing regions. The transmissive slits 804 may be spatially arranged to ensure that the left/right image portions are only visible in the corresponding left/right viewing regions for which they are intended. The parallax barrier 702 may be provided by a static physical layer in which the slits are precisely positioned, or electronically generated on an adaptive intermediate liquid crystal display layer.

The periodic optical element 110, including one of the lenticular lens array 502 or the parallax barrier 702 having transmissive slits 804, may be operable with the display panel 106, including one of the array 202 of light-emitting diodes 208 or the backlight 302 and light valve array 304.

As illustrated in FIGS. 5 and 6, the periodic optical element 110 may be invariant along an optical axis (OA) having a slant angle α relative to the grid axes 204. For example, the periodic optical element 110 may have transmissive features, such as the lenslets or the transmissive slits, that are invariant along the optical axis (OA) and are periodic along an orthogonal axis that is orthogonal to the optical axis (OA). As a specific example, the periodic optical element 110 may have transmissive slits that are parallel to the optical axis (OA) and are equally spaced along the orthogonal axis. As another specific example, the periodic optical element 110 may have cylindrical lenslets that are invariant in shape along the optical axis (OA), have curvature along the orthogonal axis, and are equally spaced (e.g., with center-to-center spacing) along the orthogonal axis. The periodic optical element 110 may be angled by the slant angle α with respect to the grid axes 204, which may optionally be parallel to edges 206 of the array 202 of light-emitting diodes 208 or edges 306 of the light valve array 304. For example, the slant angle α may be within a specified angular tolerance of forty-five degrees, such as being between forty-four and forty-six degrees for a tolerance of +/− one degree, between forty-three and forty-seven degrees for a tolerance of +/− two degrees, between forty-two and forty-eight degrees for a tolerance of +/− three degrees, between forty-one and forty-nine degrees for a tolerance of +/− four degrees, between forty and fifty degrees for a tolerance of +/− five degrees, or another suitable angle or angular range.

As illustrated in FIG. 1, the 3D display 102 may include a material 114 disposed between the display panel 106 and the periodic optical element 110. In some examples, the material 114 may extend fully between the display panel 106 and the periodic optical element 110, such that a light ray originating at the display panel 106 passes only through the material 114 (and does not pass through any air or unfilled volume) before arriving at the periodic optical element 110. In other examples, the material 114 may occupy only a portion of the volume between the display panel 106 and the periodic optical element 110, such that a light ray originating at the display panel 106 passes through at least some of the material 114 and passes through a volume of air before arriving at the periodic optical element 110. The material 114 may have a refractive index denoted by n. The value of the refractive index n may be between about 1.3 and about 2, although other suitable values may also be used. Suitable materials may include glass, plastic, a transparent optical adhesive, and others. In some examples, the material 114 may be dispensed in a liquid form, then cured in place, such as by exposure to ultraviolet light or heat. In other examples, the material 114 may be manufactured as a solid unit and placed in its location in the 3D display 102. For example, the material 114 may function as a cover glass for the display panel 106. In some examples, the material 114 may function as a relatively precise spacing element. For example, the material 114 may be manufactured to have a specified thickness to within a specified thickness tolerance and may set the spacing between the display panel 106 and periodic optical element 110 to have a value equal to the specified thickness when the 3D display 102 is assembled.

As illustrated in FIG. 1, the 3D display 102 may include a viewer tracker 116 that may determine a location of the viewer 104. The viewer tracker 116 may provide a tracked position of the viewer 104 (e.g., of a head of the viewer 104, or of one or both eyes of the viewer 104, or of another anatomical feature of the viewer 104). The viewer tracker 116 may be coupled to the controller 118 (described below), such as by providing viewer location data (shown in FIG. 1 as coordinates xv, yv, and zv) that represents a measured position or location of the viewer 104. The viewer tracker 116 may provide the viewer location data at regular or irregular intervals to the controller 118. The viewer tracker 116 may include a camera configured to capture an image of the viewer 104. The viewer tracker 116 may further include an image processor (or general-purpose computer programmed as an image processor) configured to determine a position of the viewer 104 within the captured image to provide the tracked position. In some examples, the controller 118 may include the image processor of the viewer tracker 116, such as by performing operations with the same processing circuitry. In other examples, the controller 118 may be separate from the image processor of the viewer tracker 116. Other suitable viewer trackers may also be used, including viewer trackers based on lidar (e.g., using time-of-flight of reflected light over a scene to of view to determine distances to one or more objects in the scene, such as a viewer's head or a viewer's eyes) or other technologies. The controller 118 may use an output of the viewer tracker 116, among other data, to calculate the stereo mapping coordinates, as described in detail below.

As illustrated in FIG. 1, the 3D display system 100 may include a controller 118. The controller 118 may include a processor 120 and memory 122 storing instructions executable by the processor 120. The instructions may be executable by the processor 120 to perform data processing activities. The data processing activities may include, for subpixels 108 of the array of subpixels 108 of the display panel 106, determining the stereo mapping coordinates of the subpixels 108, and causing the display panel 106 to display the image according to the stereo mapping coordinates. These data processing activities are described in detail below.

Figure 9:
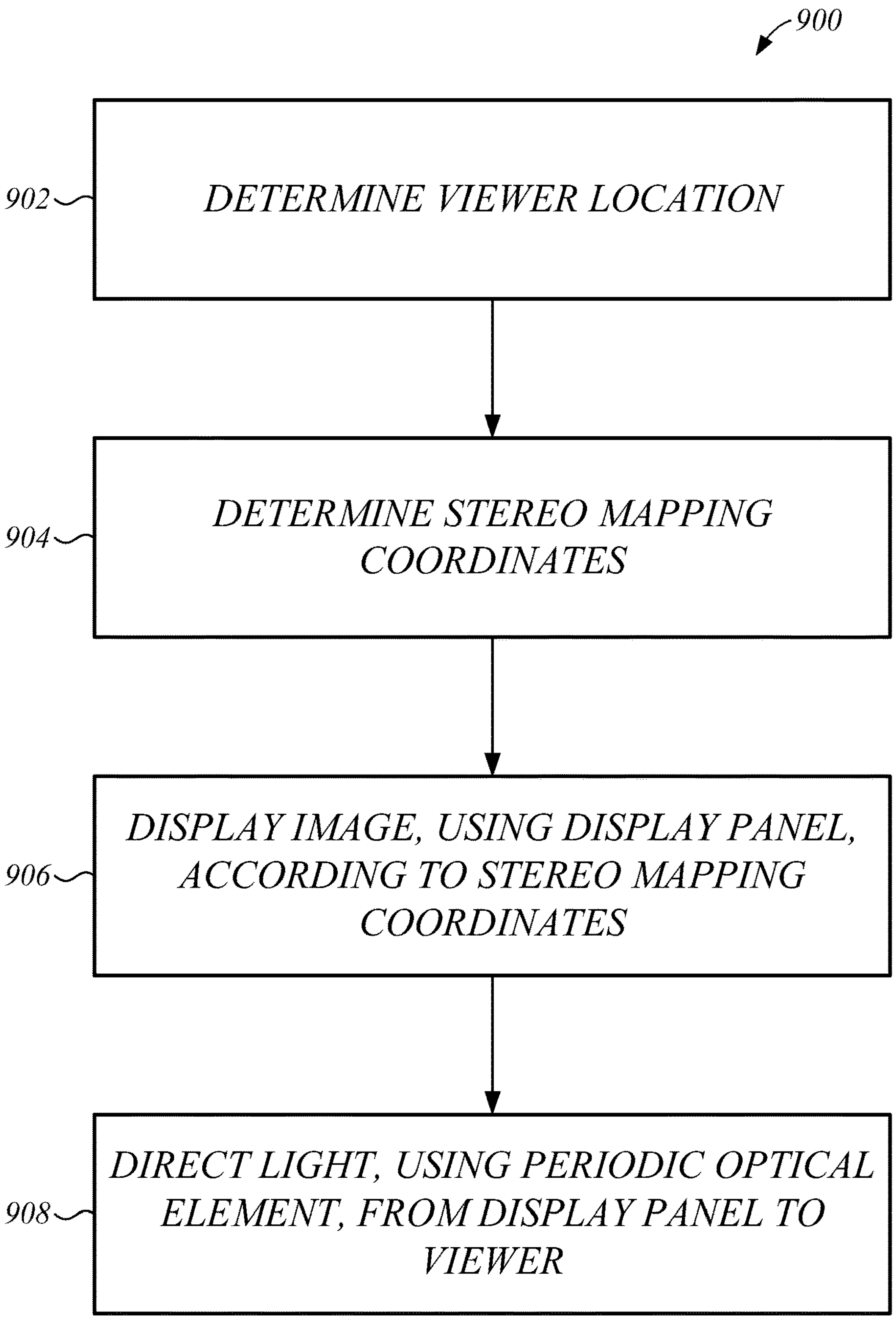
FIG. 9 illustrates a flowchart a method of displaying a 3D image in an example, according to an embodiment of the principles described herein.

FIG. 9 illustrates a flowchart a method 900 of displaying a 3D image in an example, according to an embodiment of the principles described herein. The method 900 of displaying a 3D image may be executed by the 3D display system 100, or by another suitable 3D display system, according to various embodiments. The method 900 of displaying a 3D image is but one method for displaying a 3D image. Other suitable methods may also be used.

At operation 902, the 3D display system may determine a location of a viewer using a viewer tracker, such as the viewer tracker 116.

At operation 904, the 3D display system may determine stereo mapping coordinates associated with the viewer.

At operation 906, the 3D display system may display an image, using a display panel having an array of subpixels, such as the display panel 106, according to the stereo mapping coordinates associated with the viewer.

At operation 908, the 3D display system may direct light from the display panel to the viewer using a periodic optical element, such as the periodic optical element 110. The periodic optical element may be invariant along an optical axis having a slant angle relative to the display panel.

The stereo mapping coordinate of a selected subpixel of the array of subpixels may be a function one or more parameters, such as the location of the viewer, a location of the selected subpixel, a phase function of the periodic optical element, a separation between the periodic optical element and the display panel, and a refractive index of a material disposed between the periodic optical element and the display panel. Of the parameters noted above, the location (in three dimensions) of the viewer may be measured dynamically by the viewer tracker during use of the 3D display system 100 the other quantities may be known a priori, without measurements taken during use of the 3D display system 100.

The stereo mapping coordinates may determine whether light from a specified subpixel is directed to a left eye or a right eye of the viewer. The controller 118 may use the stereo mapping coordinate of the specified subpixel to select which image to represent with the specified subpixel, such as a subpixel of a "left image" to be directed to the left eye of the viewer, a subpixel of a "right image" to be directed to the right eye of the viewer, or a weighted combination of the subpixel of "left image" and the subpixel of the "right image."

Figure 10:
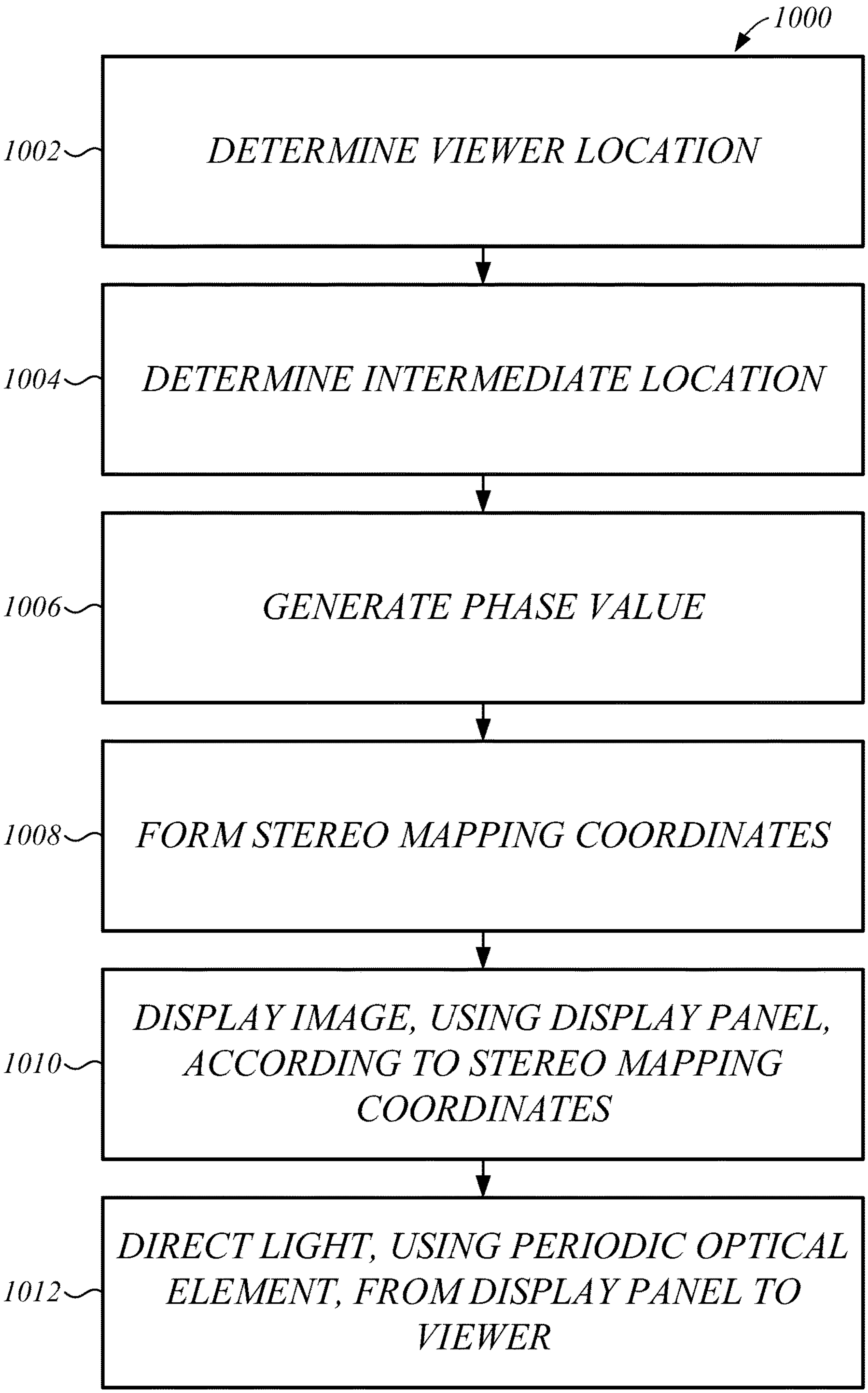
FIG. 10 illustrates a flowchart of a method of displaying a 3D image in an example, according to another embodiment of the principles described herein.

FIG. 10 illustrates a flowchart of a method 1000 of displaying a 3D image in an example, according to another embodiment of the principles described herein. The method 1000 of displaying a 3D image may be executed by the 3D display system 100, or by another suitable 3D display system, according to various embodiments. The method 1000 of displaying a 3D image is but one method for displaying a 3D image. Other suitable methods may also be used. In an example, operation 904 (e.g., determining the stereo mapping coordinates associated with the viewer) from the method 900 can comprise operations 1004, 1006, and 1008.

At operation 1002, the 3D display system may determine a location of a viewer using a viewer tracker, such as the viewer tracker.

At operation 1004, the 3D display system may determine an intermediate location as a function of one or more parameters, such as the location of the viewer, the location of the selected subpixel, the separation between the periodic optical element and the display panel, and the refractive index of the material disposed between the periodic optical element and the display panel. The intermediate location may correspond to a location on the periodic optical element at which a light ray originating at the display panel and arriving at the viewer passes through the periodic optical element.

The intermediate location may be determined in closed mathematical form, using raytracing and the following four assumptions. First, it is assumed that the volume between the display panel and the periodic optical element is occupied by a material having a refractive index greater than 1. Second, it is assumed that the volume between the periodic optical element is occupied by air, having a refractive index of 1. Third, it is assumed that the periodic optical element forms a planar interface between air and the material having the refractive index greater than 1. Fourth, it is assumed that a light ray refracts at the planar interface located at a plane of the periodic optical element.

To provide a mathematical notation, it is assumed that the display panel extends in the (x, y) plane at a first z-location, and the periodic optical element extends in the in the (x, y) plane at a second z-location. A location of a selected subpixel at the display panel is denoted as (xs, ys). The intermediate location at the periodic optical element is denoted as (xi, yi). The (measured) location of the viewer is denoted as (xv, yv, zv).

In general terms, determining the intermediate location may include determining an x-coordinate of the intermediate location as a function of parameters including the location of the viewer, an x-coordinate of the location of the selected subpixel, the separation between the periodic optical element and the display panel, and the refractive index of the material disposed between the periodic optical element and the display panel. Similarly, determining the intermediate location may include determining a y-coordinate of the intermediate location as a function of parameters including the location of the viewer, a y-coordinate of the location of the selected subpixel, the separation between the periodic optical element and the display panel, and the refractive index of the material disposed between the periodic optical element and the display panel.

In mathematical terms, determining the intermediate location may include setting a dimensionless quantity q according to equation (1)

$$q = \frac{d}{n\sqrt{zv^2 + \left(1 - \frac{1}{n^2}\right)\left[(xv - xs)^2 + (yv - ys)^2\right]}} \tag{1}$$

wherein d is the separation between the periodic optical element and the display panel, n is the refractive index of the material disposed between the periodic optical element and the display panel, xv is an x-component of the location of the viewer, yv is a y-component of the location of the viewer, zv is a z-component of the location of the viewer, xs is an x-component of the location of the selected subpixel, and ys is a y-component of the location of the selected subpixel.

Determining the intermediate location may further include setting an x-coordinate of the intermediate location xi according to equation (2)

$$xi = xs + q(xv - xs) \tag{2}$$

Determining the intermediate location may further include setting a y-coordinate of the intermediate location yi according to equation (3)

$$yi = ys + q(yv - ys) \quad (3)$$

The intermediate location (xi, yi) corresponds to the location on the periodic optical element at which a light ray originating at the display panel at subpixel location (xs, ys) and arriving at the viewer at location (xv, yv, zv) passes through the periodic optical element.

Returning to FIG. 10, at operation 1006, the 3D display system may apply a phase function to the intermediate location to generate a phase value.

The phase function may be linear with respect to location on the periodic optical element in a direction angled relative to the optical axis. The phase function may receive, as input, an intermediate location as determined in operation 1004. The phase function may generate a single phase value as a function of the intermediate location.

For example, along an extent of a first lenticular lens or a first transmissive slit, the phase value may have a first value, such as zero. The phase value may increase linearly between the first lenticular lens or first transmissive slit and an adjacent second lenticular lens or second transmissive slit. Along an extent of the second lenticular lens or the second transmissive slit, the phase value may have a second value, such as one. The phase value may be linear in this manner, having values that are constant along each lenticular lens or each transmissive slit, and having values that increase linearly in the area between adjacent lenticular lenses or the adjacent transmissive slits.

In some examples, the phase function may effectively "number" the lenticular lenses or transmissive slits sequentially, by having integer values at the lenticular lenses or transmissive slits and having linearly increasing fractional values between the lenticular lenses or transmissive slits.

In general terms, applying the phase function to the intermediate location to generate the phase value may include summing a first quantity, a second quantity, and a third quantity to form the phase value. The first quantity may represent a phase at a specified location on the display panel, such as at a center of the display panel or a center of the periodic optical element. The second quantity may be an x-coordinate of the intermediate location divided by a period, along the x-direction, of the periodic optical element. The third quantity may be a y-coordinate of the intermediate location divided by a period, along the y-direction, of the periodic optical element.

In mathematical terms, applying the phase function to the intermediate location to generate the phase value may include setting the phase value @ according to equation (4)

$$\phi = \phi c + \frac{xi + yi\tan\alpha}{px} \quad (4)$$

wherein ϕc is a phase value at a center of the periodic optical element (or other specified location on the periodic optical element or the display panel), xi is an x-component of the intermediate location, yi is a y-component of the intermediate location, α is the slant angle, and px is a period of the periodic optical element (see FIGS. 5 and 6) taken along an x-direction. Note that the tangent of the slant angle, α, equals the period of the periodic element in the x-direction, px, divided by a period of the periodic element in the y-direction, py (see FIGS. 5 and 6).

Returning to FIG. 10, at operation 1008, the 3D display system may use the phase value to form stereo mapping coordinates associated with the viewer.

In general terms, using the phase value to form the stereo mapping coordinate may include taking a modulo of the phase value to form the stereo mapping coordinate.

In mathematical terms, for a phase function that assigns sequential integers to lenticular lenses or transmissive slits, using the phase value to form the stereo mapping coordinate may include setting the stereo mapping coordinate S according to equation (5)

$$S = \phi \bmod 1 \quad (5)$$

wherein ϕ is the phase value. For example, for a specified subpixel, if the phase value ϕ equals 5.7, then the corresponding stereo mapping coordinate S equals 0.7.

In some configurations, the 3D display system may display two adjacent views of a multiview image. For example, the 3D display system may assign more than two views by mapping view k of N to phase band [k/N, (k+1)/N]. Other suitable configurations can also be used.

At operation 1010, the 3D display system may display an image, using a display panel having an array of subpixels, such as the display panel 106, according to the stereo mapping coordinates associated with the viewer. The controller 118 may cause the display panel to display the image according to the stereo mapping coordinates of the subpixels of the display panel. Two configurations are described below of displaying the image according to the stereo coordinates.

In a first configuration, displaying the image according to the stereo mapping coordinate of a selected subpixel may include comparing the stereo mapping coordinate to a specified threshold value. In some examples, the specified threshold value may be a midpoint (e.g., 0.5) of a specified range (e.g., between 0 and 1) of the stereo mapping coordinates. In response to the comparison, the controller 118 may cause the display panel to display on the selected subpixel one of a portion of the image corresponding to a left eye of the viewer, or a portion of the image corresponding to a right eye of the viewer. For the example of a phase function that assigns sequential integers to lenticular lenses or transmissive slits, the specified threshold value may equal 0.5. If the stereo mapping coordinate is between 0 and 0.5, the specified subpixel is positioned to direct light to the left eye (or right eye) of the viewer. If the stereo mapping coordinate is between 0.5 and 1, the specified subpixel is positioned to direct light to the right eye (or left eye) of the viewer.

In a second configuration, displaying the image according to the stereo mapping coordinate of a selected subpixel may include combining, in a ratio that depends on a value of the stereo mapping coordinate, a portion of the image corresponding to a left eye of the viewer and a portion of the image corresponding to a right eye of the viewer to form a blended portion of the image, and displaying the blended portion of the image on the selected subpixel. The ratio may vary according to a non-linear smoothing function. The non-linear smoothing function may form the blended portion of the image in linear color space. Such a blending of the images may smooth transitions between images that may occur at specific values of the stereo mapping coordinate, such as at or close to values of 0, 0.5, and 1.

At operation 1012, the 3D display system may direct light from the display panel to the viewer using a periodic optical element, such as the periodic optical element 110. The periodic optical element may be invariant along an optical axis having a slant angle relative to the display panel.

At a viewing distance D from the 3D display, the stereo viewing window (e.g., where the phase value of a given subpixel varies over its full range, such as from 0 to 1) may have a spatial extent of n*D*px/d. In some examples, the viewing window may cover twice the viewer interocular distance IO For these examples, we may select the period of the periodic element in the x-direction px to equal (or roughly equal) (2*IO*d)/(n*D).

To further illustrate the systems and related methods disclosed herein, a non-limiting list of examples is provided below. Each of the following non-limiting examples may stand on its own or may be combined in any permutation or combination with any one or more of the other examples.

In Example 1, a method of displaying a three-dimensional (3D) image may comprise: determining a location of a viewer using a viewer tracker; determining stereo mapping coordinates associated with the viewer; displaying an image, using a display panel having an array of subpixels, according to the stereo mapping coordinates associated with the viewer; and directing light from the display panel to the viewer using a periodic optical element, the periodic optical element being invariant along an optical axis having a slant angle relative to the display panel, the stereo mapping coordinate of a selected subpixel of the array of subpixels being a function of the location of the viewer, a location of the selected subpixel, a phase function of the periodic optical element, a separation between the periodic optical element and the display panel, and a refractive index of a material disposed between the periodic optical element and the display panel.

In Example 2, the method of Example 1 may optionally be configured such that determining the stereo mapping coordinate of the selected subpixel comprises: determining an intermediate location as a function of the location of the viewer, the location of the selected subpixel, the separation between the periodic optical element and the display panel, and the refractive index of the material disposed between the periodic optical element and the display panel; applying the phase function to the intermediate location to generate a phase value; and using the phase value to form the stereo mapping coordinate.

In Example 3, the method of any one of Examples 1-2 may optionally be configured such that the intermediate location corresponds to a location on the periodic optical element at which a light ray originating at the display panel and arriving at the viewer passes through the periodic optical element.

In Example 4, the method of any one of Examples 1-3 may optionally be configured such that determining the intermediate location comprises: determining an x-coordinate of the intermediate location as a function of the location of the viewer, an x-coordinate of the location of the selected subpixel, the separation between the periodic optical element and the display panel, and the refractive index of the material disposed between the periodic optical element and the display panel; and determining a y-coordinate of the intermediate location as a function of the location of the viewer, a y-coordinate of the location of the selected subpixel, the separation between the periodic optical element and the display panel, and the refractive index of the material disposed between the periodic optical element and the display panel.

In Example 5, the method of any one of Examples 1~4 may optionally be configured such that determining the intermediate location comprises: setting a dimensionless quantity q given by $$q = \frac{d}{n\sqrt{zv^2 + \left(1 - \frac{1}{n^2}\right)\left[(xv - xs)^2 + (yv - ys)^2\right]}}$$

wherein d is the separation between the periodic optical element and the display panel, n is the refractive index of the material disposed between the periodic optical element and the display panel, xv is an x-component of the location of the viewer, yv is a y-component of the location of the viewer, zv is a z-component of the location of the viewer, xs is an x-component of the location of the selected subpixel, and ys is a y-component of the location of the selected subpixel; setting an x-coordinate of the intermediate location xi to equal xi=xs+q(xv−xs); and setting a y-coordinate of the intermediate location yi to equal yi=ys+q(yv−ys).

In Example 6, the method of any one of Examples 1-5 may optionally be configured such that the phase function is linear with respect to location on the periodic optical element in a direction angled relative to the optical axis.

In Example 7, the method of any one of Examples 1-6 may optionally be configured such that applying the phase function to the intermediate location to generate the phase value comprises: summing a first quantity, a second quantity, and a third quantity to form the phase value, the first quantity representing a phase at a specified location on the display panel, the second quantity being an x-coordinate of the intermediate location divided by a period, along an x-direction, of the periodic optical element, the third quantity being a y-coordinate of the intermediate location divided by a period, along a y-direction, of the periodic optical element.

In Example 8, the method of any one of Examples 1-7 may optionally be configured such that applying the phase function to the intermediate location to generate the phase value comprises: setting the phase value to a phase value ϕ given by $$\phi = \phi c + \frac{xi + yi\tan\alpha}{px}$$

wherein ϕc is a phase value at a center of the periodic optical element, xi is an x-component of the intermediate location, yi is a y-component of the intermediate location, α is the slant angle, and px is a period of the periodic optical element taken along an x-direction.

In Example 9, the method of any one of Examples 1-8 may optionally be configured such that using the phase value to form the stereo mapping coordinate comprises: taking a modulo of the phase value to form the stereo mapping coordinate.

In Example 10, the method of any one of Examples 1-9 may optionally be configured such that using the phase value to form the stereo mapping coordinate comprises: setting the stereo mapping coordinate S to equal S=ϕ mod 1, wherein ϕ is the phase value.

In Example 11, the method of any one of Examples 1-10 may optionally be configured such that displaying the image according to the stereo mapping coordinate of the selected subpixel comprises: comparing the stereo mapping coordinate to a specified threshold value; and in response to the comparison, displaying on the selected subpixel one of a portion of the image corresponding to a left eye of the viewer or a portion of the image corresponding to a right eye of the viewer.

In Example 12, the method of any one of Examples 1-11 may optionally be configured such that displaying the image according to the stereo mapping coordinate of the selected subpixel comprises: combining, in a ratio that depends on a value of the stereo mapping coordinate, a portion of the image corresponding to a left eye of the viewer and a portion of the image corresponding to a right eye of the viewer to form a blended portion of the image and displaying the blended portion of the image on the selected subpixel.

In Example 13, the method of any one of Examples 1-12 may optionally be configured such that the ratio is configured to vary according to a non-linear smoothing function, the non-linear smoothing function configured to form the blended portion of the image in linear color space.

In Example 14, a three-dimensional (3D) display may comprise: a display panel having an array of subpixels configured to display an image according to stereo mapping coordinates associated with a viewer; a periodic optical element configured to direct light from the display panel to the viewer, the periodic optical element being invariant along an optical axis having a slant angle relative to the display panel; and a viewer tracker configured to determine a location of the viewer, the stereo mapping coordinate of a selected subpixel of the array of subpixels being a function of the location of the viewer, a location of the selected subpixel, a phase function of the periodic optical element, a separation between the periodic optical element and the display panel, and a refractive index of a material disposed between the periodic optical element and the display panel.

In Example 15, the 3D display of Example 14 may optionally be configured such that the periodic optical element comprises one of a lenticular lens array or a parallax barrier having transmissive slits.

In Example 16, the 3D display of any one of Examples 14-15 may optionally be configured such that the display panel is an organic light-emitting diode array with a pentile subpixel arrangement and the display panel is configured to turn off subpixel rendering when the image is displayed.

In Example 17, the 3D display of any one of Examples 14-16 may optionally be configured such that the slant angle is within a specified angular tolerance of forty-five degrees.

In Example 18, a three-dimensional (3D) display system may comprise: a display panel having an array of subpixels configured to display an image according to stereo mapping coordinates associated with a viewer, the subpixels being located at subpixel locations in a grid having grid axes; a periodic optical element configured to direct light corresponding to the image from the display panel to the viewer, the periodic optical element being invariant along an optical axis having a slant angle relative to the grid axes; a viewer tracker configured to determine a location of the viewer; and a controller comprising a processor and memory storing instructions executable by the processor, the instructions being executable by the processor to perform data processing activities, the data processing activities comprising, for a selected subpixel of the array of subpixels: setting a dimensionless quantity q given by $$q = \frac{d}{n\sqrt{zv^2 + \left(1 - \frac{1}{n^2}\right)\left[(xv - xs)^2 + (yv - ys)^2\right]}}$$

wherein d is a separation between the periodic optical element and the display panel, n is a refractive index of a material disposed between the periodic optical element and the display panel, xv is an x-component of the location of the viewer, yv is a y-component of the location of the viewer, zv is a z-component of the location of the viewer, xs is an x-component of the location of the selected subpixel, and ys is a y-component of the location of the selected subpixel; setting an x-coordinate of an intermediate location xi to equal xi=xd+q(xv−xs); setting a y-coordinate of the intermediate location yi to equal yi=yd+q(yv−ys); and setting the phase value to a phase value ϕ given by $$\phi = \phi c + \frac{xi + yi\tan\alpha}{px}$$

wherein ϕc is a phase value at a specified location of the periodic optical element, α is the slant angle, and px is a period of the periodic optical element taken along an x-direction and setting the stereo mapping coordinate S to equal S=ϕ mod 1.

In Example 19, the 3D display system of Example 18 may optionally be configured such that the data processing activities further comprise: comparing the stereo mapping coordinate to a specified threshold value, the specified threshold value being a midpoint of a specified range of the stereo mapping coordinates; and in response to the comparison, causing the selected subpixel of the display panel to display one of a portion of the image corresponding to a left eye of the viewer or a portion of the image corresponding to a right eye of the viewer.

In Example 20, the 3D display system of any one of Examples 18-19 may optionally be configured such that the data processing activities further comprise: combining, in a ratio that depends on a value of the stereo mapping coordinate, a portion of the image corresponding to a left eye of the viewer and a portion of the image corresponding to a right eye of the viewer to form a blended portion of the image; and causing the display panel to display the blended portion of the image on the selected subpixel, the ratio being configured to vary according to a non-linear smoothing function, the non-linear smoothing function configured to form the blended portion of the image in linear color space.

Thus, there have been described examples and embodiments of a 3D display system and method that may display an image according to stereo mapping coordinates associated with a viewer. The above-described examples are merely illustrative of some of the many specific examples that represent the principles described herein. Clearly, those skilled in the art may readily devise numerous other arrangements without departing from the scope as defined by the following claims.

What is claimed is:

1. A method for displaying a three-dimensional (3D) image, the method comprising:

determining a location of a viewer using a viewer tracker;

determining stereo mapping coordinates associated with the viewer;

displaying an image, using a display panel having an array of subpixels, according to the stereo mapping coordinates associated with the viewer; and directing light from the display panel to the viewer using a periodic optical element, the periodic optical element being invariant along an optical axis having a slant angle relative to the display panel, wherein determining the stereo mapping coordinate of a selected subpixel of the array of subpixels comprises:
determining an intermediate location as a function of the location of the viewer, a location of the selected subpixel, a separation between the periodic optical element and the display panel, and a refractive index of a material disposed between the periodic optical element and the display panel;
applying a phase function of the periodic optical element to the intermediate location to generate a phase value; and
using the phase value to form the stereo mapping coordinate.

2. The method of claim 1, wherein the intermediate location corresponds to a location on the periodic optical element at which a light ray originating at the display panel and arriving at the viewer passes through the periodic optical element.

3. The method of claim 1, wherein determining the intermediate location comprises:
determining an x-coordinate of the intermediate location as a function of the location of the viewer, an x-coordinate of the location of the selected subpixel, the separation between the periodic optical element and the display panel, and the refractive index of the material disposed between the periodic optical element and the display panel; and
determining a y-coordinate of the intermediate location as a function of the location of the viewer, a y-coordinate of the location of the selected subpixel, the separation between the periodic optical element and the display panel, and the refractive index of the material disposed between the periodic optical element and the display panel.

4. The method of claim 1, wherein determining the intermediate location comprises:
setting a quantity, q, to equal $$q = d/(n\sqrt{([[zv]]^{\wedge}22 + (21-21/n^{\wedge}22)[[[xv-xs)]]^{\wedge}22 + [[(yv-ys)]]^{\wedge}22]))},$$

wherein:
quantity d is the separation between the periodic optical element and the display panel;
quantity n is the refractive index of the material disposed between the periodic optical element and the display panel;
quantity xv is an x-component of the location of the viewer;
quantity yv is a y-component of the location of the viewer;
quantity zv is a z-component of the location of the viewer;
quantity xs is an x-component of the location of the selected subpixel; and
quantity ys is a y-component of the location of the selected subpixel;
setting an x-coordinate of the intermediate location, xi, to equal $$xi = xs + q(xv-xs);$$

and
setting a y-coordinate of the intermediate location, yi, to equal $$yi = ys + q(yv-ys).$$

5. The method of claim 1, wherein the phase function is linear with respect to location on the periodic optical element in a direction angled relative to the optical axis.

6. The method of claim 1, wherein applying the phase function to the intermediate location to generate the phase value comprises:
summing a first quantity, a second quantity, and a third quantity to form the phase value,
the first quantity representing a phase at a specified location on the display panel,
the second quantity being an x-coordinate of the intermediate location divided by a period, along an x-direction, of the periodic optical element,
the third quantity being a y-coordinate of the intermediate location divided by a period, along a y-direction, of the periodic optical element.

7. The method of claim 1, wherein applying the phase function to the intermediate location to generate the phase value comprises:
setting the phase value, ϕ, to equal $$\phi = \phi c + (xi + yi\tan(\alpha))/px,$$

wherein:
quantity ϕc is a phase value at a center of the periodic optical element;
quantity xi is an x-component of the intermediate location;
quantity yi is a y-component of the intermediate location;
quantity α is the slant angle; and
quantity px is a period of the periodic optical element, taken along an x-direction.

8. The method of claim 1, wherein using the phase value to form the stereo mapping coordinate comprises:
taking a modulo of the phase value to form the stereo mapping coordinate.

9. The method of claim 1, wherein using the phase value to form the stereo mapping coordinate comprises:
setting the stereo mapping coordinate, S, to equal $$S = \phi \bmod 21,$$

wherein quantity ϕ is the phase value.

10. The method of claim 1, wherein displaying the image according to the stereo mapping coordinate of the selected subpixel comprises:
comparing the stereo mapping coordinate to a specified threshold value; and
in response to the comparison, displaying on the selected subpixel one of:
a portion of the image corresponding to a left eye of the viewer; or
a portion of the image corresponding to a right eye of the viewer.

11. The method of claim 1, wherein displaying the image according to the stereo mapping coordinate of the selected subpixel comprises:

combining, in a ratio that depends on a value of the stereo mapping coordinate, a portion of the image corresponding to a left eye of the viewer and a portion of the image corresponding to a right eye of the viewer to form a blended portion of the image; and displaying the blended portion of the image on the selected subpixel.

12. The method of claim 11, wherein the ratio is configured to vary according to a non-linear smoothing function, the non-linear smoothing function configured to form the blended portion of the image in linear color space.

13. A three-dimensional (3D) display system comprising:

a display panel having an array of subpixels configured to display an image according to stereo mapping coordinates associated with a viewer, the subpixels being located at subpixel locations in a grid having grid axes;

a periodic optical element configured to direct light corresponding to the image from the display panel to the viewer, the periodic optical element being invariant along an optical axis having a slant angle relative to the grid axes;

a viewer tracker configured to determine a location of the viewer; and a controller comprising a processor and memory storing instructions executable by the processor, the instructions being executable by the processor to perform data processing activities, the data processing activities comprising, for a selected subpixel of the array of subpixels:

setting a quantity, q, to equal $$q = d/(n\surd([\![zv]\!]\text{^}22 + (21-21/n\text{^}22)[[\![xv-xs)]\!]\text{^}22 + [\![(yv-ys)]\!]\text{^}22])),$$

wherein:

quantity d is a separation between the periodic optical element and the display panel;

quantity n is a refractive index of a material disposed between the periodic optical element and the display panel;

quantity xv is an x-component of the location of the viewer;

quantity yv is a y-component of the location of the viewer;

quantity zv is a z-component of the location of the viewer;

quantity xs is an x-component of the location of the selected subpixel; and quantity ys is a y-component of the location of the selected subpixel;

setting an x-coordinate of an intermediate location, xi, to equal $$xi = xs + q(xv-xs);$$

setting a y-coordinate of the intermediate location, yi, to equal $$yi = ys + q(yv-ys);$$

setting a phase value, ϕ, to equal $$\phi = \phi c + (xi + yi\tan(\alpha))/px,$$

wherein:

quantity ϕc is a phase value at a specified location of the periodic optical element;

quantity α is the slant angle; and quantity px is a period of the periodic optical element, taken along an x-direction; and setting the stereo mapping coordinate, S, to equal $$S = \phi \text{mod} 21.$$

14. The 3D display system of claim 13, wherein the data processing activities further comprise:

comparing the stereo mapping coordinate to a specified threshold value, the specified threshold value being a midpoint of a specified range of the stereo mapping coordinates; and in response to the comparison, causing the selected subpixel of the display panel to display one of:

a portion of the image corresponding to a left eye of the viewer; or a portion of the image corresponding to a right eye of the viewer.

15. The 3D display system of claim 13, wherein the data processing activities further comprise:

combining, in a ratio that depends on a value of the stereo mapping coordinate, a portion of the image corresponding to a left eye of the viewer and a portion of the image corresponding to a right eye of the viewer to form a blended portion of the image; and causing the display panel to display the blended portion of the image on the selected subpixel, the ratio being configured to vary according to a non-linear smoothing function, the non-linear smoothing function configured to form the blended portion of the image in linear color space.

16. A three-dimensional (3D) display comprising:

a display panel having an array of subpixels configured to display an image according to stereo mapping coordinates associated with a viewer;

a periodic optical element configured to direct light from the display panel to the viewer, the periodic optical element being invariant along an optical axis having a slant angle relative to the display panel;

a viewer tracker configured to determine a location of the viewer; and a controller comprising a processor and memory storing instructions executable by the processor, the instructions being executable by the processor to perform data processing activities, the data processing activities comprising, for a selected subpixel of the array of subpixels:

determining an intermediate location as a function of the location of the viewer, a location of the selected subpixel, a separation between the periodic optical element and the display panel, and a refractive index of a material disposed between the periodic optical element and the display panel;

applying a phase function of the periodic optical element to the intermediate location to generate a phase value; and using the phase value to form the stereo mapping coordinate of the selected subpixel of the array of subpixels.

17. The 3D display of claim 16, wherein the periodic optical element comprises one of a lenticular lens array or a parallax barrier having transmissive slits.

18. The 3D display of claim 16, wherein:

the display panel is an organic light-emitting diode array with a pentile subpixel arrangement; and the display panel is configured to turn off subpixel rendering when the image is displayed.

19. The 3D display of claim 16, wherein the slant angle is within a specified angular tolerance of forty-five degrees.

* * * * *